(12) United States Patent
Li et al.

(10) Patent No.: US 8,816,554 B2
(45) Date of Patent: Aug. 26, 2014

(54) MOTOR

(75) Inventors: Hu Li, Osaka (JP); Yuichi Yoshikawa, Osaka (JP); Hiroshi Murakami, Osaka (JP); Hideaki Matsuo, Osaka (JP); Yuichiro Tashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 159 days.

(21) Appl. No.: 13/574,531

(22) PCT Filed: Mar. 7, 2011

(86) PCT No.: PCT/JP2011/001309
§ 371 (c)(1),
(2), (4) Date: Jul. 20, 2012

(87) PCT Pub. No.: WO2011/111357
PCT Pub. Date: Sep. 15, 2011

(65) Prior Publication Data
US 2012/0286616 A1 Nov. 15, 2012

(30) Foreign Application Priority Data
Mar. 8, 2010 (JP) ................................. 2010-050259

(51) Int. Cl.
*H02K 16/00* (2006.01)
(52) U.S. Cl.
USPC .......................................... 310/114; 310/112
(58) Field of Classification Search
USPC .......................................... 310/112–114, 266
See application file for complete search history.

(56) References Cited

U.S. PATENT DOCUMENTS

| | | | |
|---|---|---|---|
| 6,590,312 B1* | 7/2003 | Seguchi et al. | 310/266 |
| 6,998,757 B2* | 2/2006 | Seguchi et al. | 310/266 |
| 2002/0047418 A1 | 4/2002 | Seguchi et al. | |
| 2004/0232800 A1 | 11/2004 | Seguchi et al. | |
| 2009/0309442 A1 | 12/2009 | Qu et al. | |

FOREIGN PATENT DOCUMENTS

| | | |
|---|---|---|
| CN | 101604890 A | 12/2009 |
| JP | 2002-165426 A | 6/2002 |
| JP | 2002-359953 A | 12/2002 |

OTHER PUBLICATIONS

International Search Report for International Application No. PCT/JP2011/001309, dated May 24, 2011, 3 pages.
Office Action, and partial English translation thereof, in corresponding Chinese Application No. 201180013032.X, dated Jan. 30, 2014, 7 pages.

* cited by examiner

*Primary Examiner* — Thanh Lam
(74) *Attorney, Agent, or Firm* — Brinks Gilson & Lione

(57) ABSTRACT

A clutch mechanism moving together with an actuator allows coupling or decoupling an inner rotor to or from a power shaft, thereby controlling a rotation angle. This structure allows a polarity of a magnetic pole of the inner rotor to be the same as that of an opposing magnetic pole of an outer rotor when the motor is driven at a low rpm, so that magnetic fluxes inter-linking with windings can be increased, which results in greater torque. When the motor is driven at a high rpm, the structure allows the polarity of the magnetic pole of the inner rotor to be different from that of the opposing magnetic pole of the outer rotor, so that an amount of leakage flux is increased, and the magnetic fluxes inter-linking with the winding are decreased. As a result, an induction voltage is lowered and a high rpm range is widened.

4 Claims, 5 Drawing Sheets

MOTOR

This application is a 371 application of PCT/JP2011/001309 having an international filing date of Mar. 7, 2011, which claims priority to JP 2010-050259 filed Mar. 8, 2010, the entire contents of which are incorporated herein by reference.

TECHNICAL FIELD

The present invention relates to a motor equipped with rotors both inside and outside a stator.

BACKGROUND ART

A dual-rotor type motor having rotors both inside and outside a stator can increase an amount of magnetic flux by capitalizing on the two rotors, thereby producing greater torque although the motor is compact size. This motor is hereinafter referred to as a dual rotor motor. The maximum rpm of this motor; however, is obliged to be lower under the condition of the power supply voltage being kept constant because an induction voltage proportional to magnetic flux inter-linking with the windings becomes higher. To obtain a greater range of a high rpm operation, an electric current for canceling the magnetic field of permanent magnets is used besides a torque current component that is used for generating torque, whereby the number of inter-lining magnetic fluxes can be reduced. This electric current is referred to as "field weakening current", and this control method is referred to as "field weakening control" which is generally practiced in the industry. However, copper loss increases substantially at a greater amount of the field weakening current. If the motor produces a greater copper loss than iron loss, this field wakening control method will substantially lower the efficiency of the motor.

To achieve both of great torque at a low speed and a high rpm by the dual rotor motor, a technique of reducing the inter-linking magnetic fluxes by a mechanical method has been proposed instead of the field weakening control method. This mechanical method is disclosed in, e.g. Patent Literature 1, which proposes that the relatively fixed angle between an inner rotor and an outer rotor of a vehicle synchronous machine be changed step by step. To be more specific, multiple screw-holes are provided to a frame connecting section of both the rotors so that combinations of fastening screws can be changed for changing the relative angle between the inner rotor and the outer rotor. This structure allows varying the relative angles between both the rotors in response to models of a vehicle or necessity before shipping the vehicles. As a result, the vehicle synchronous machines of a greater number of types can be manufactured with a fewer models, and the loads to manufacturing and maintenance can be thus alleviated.

Another synchronous machine employing a dual rotor motor is proposed. A second rotor can be rotated relative to a first rotor within a given angle range, and they cannot be relatively rotated outside the given angle range, namely, this machine includes a mutually regulating mechanism for rotors. This proposal is disclosed in, e.g. Patent Literature 2. This mechanism allows controlling both of the rotors to stay at either one of two steady angle positions where the rotors can relatively and steadily rotate, and combined field magnetic fluxes of different sizes inter-link with the armature coil at these two steady positions. This method is suitable for a generator motor linked to a car-engine that needs great torque at a low rpm and uses a wide range of rpm.

The synchronous machine disclosed in Patent Literature 1, i.e. a relatively fixed angle between the inner rotor and the outer rotor can be varied step by step by changing combinations of screw fastenings before the machine is shipped. This machine is thus not good for an application of frequent changes between two operation modes, namely, great torque at a low rpm and a high rpm.

The synchronous machine disclosed in Patent Literature 2, i.e. it has a mutually regulating mechanism for rotors, and this mechanism allows the second rotor to rotate relatively to the first rotor within a given angle range, and it prohibits the relative rotation outside the given angle range. Since this synchronous machine controls two steady angle positions in a rotating direction and counter-rotating direction, it is suitable for a generator motor rotating in a single direction; however, it cannot be used in an application of rotating in either directions.

Patent Literature 1: Unexamined Japanese Patent Application Publication No. 2002-359953
Patent Literature 2: Unexamined Japanese Patent Application Publication No. 2002-165426

DISCLOSURE OF THE INVENTION

The present invention relates to a dual rotor motor that comprises the following structural elements:
- a stator including a stator core formed of an annular yoke and multiple teeth, and windings wound on the stator core;
- an inner rotor disposed rotatably on a rotary shaft and inside the stator; and
- an outer rotor disposed rotatably on a rotary shaft and outside the stator.

The foregoing dual rotor motor is switchable between the following two states: at a low rpm the magnetic pole of the inner rotor has the same polarity as that of the opposing magnetic pole of the outer rotor, and at a high rpm the magnetic pole of the inner rotor has different polarity from that of the opposing magnetic pole of the outer rotor.

The foregoing structure allows the motor to generate great torque at a low rpm because the magnetic poles opposing to each other of the inner and outer rotors have the same polarity, so that a greater number of magnetic fluxes inter-link with the windings. As a result, greater torque can be generated. The foregoing structure also allows the motor to widen a high rpm range because the magnetic poles opposing to each other of the inner and outer rotors have different polarities, so that a greater number of leakage magnetic fluxes is produced and thus a smaller number of magnetic fluxes inter-link with the windings. As a result, an induction voltage is lowered and the high rpm range can be thus widened.

DETAILED DESCRIPTION OF THE PREFERRED EMBODIMENT

An exemplary embodiment of the present invention is demonstrated hereinafter with reference to the accompanying drawings.

Figure 1:
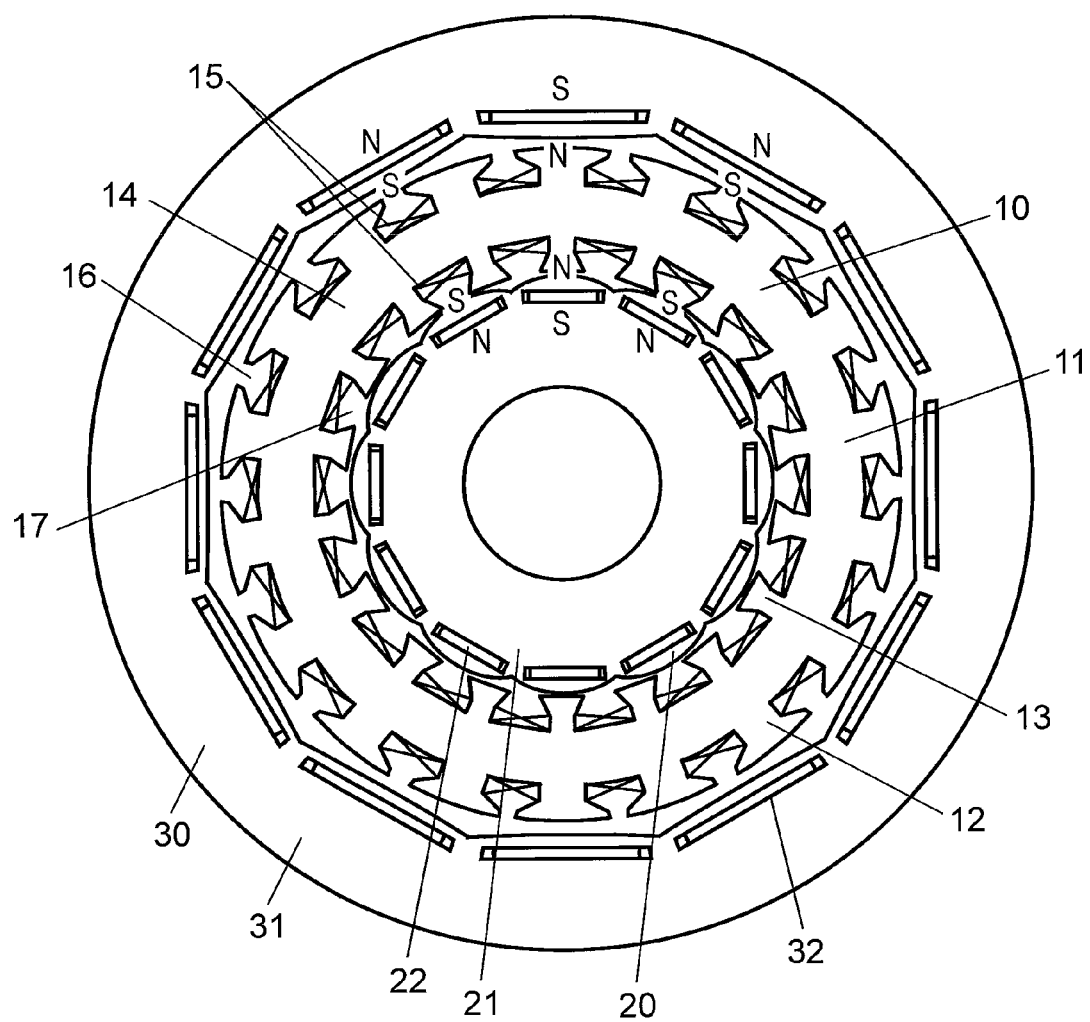
FIG. 1 shows a dual rotor motor in accordance with an embodiment of the present invention, and magnetic poles of an outer rotor have the same polarity as that of opposing magnetic poles of an inner rotor.
Figure 2:
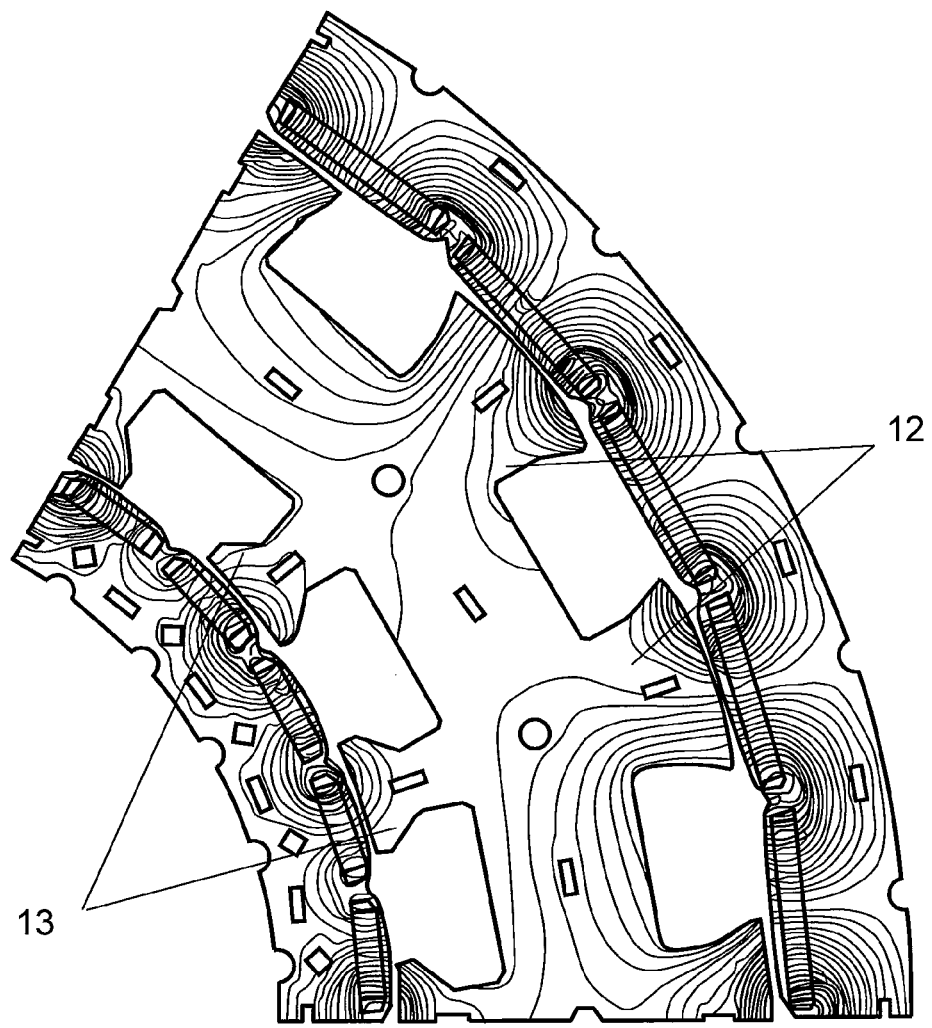
FIG. 2 shows flows of magnetic fluxes when magnetic poles of the outer rotor have the same polarity as that of opposing magnetic poles of the inner rotor of the dual rotor motor in accordance with the embodiment.
Figure 3:
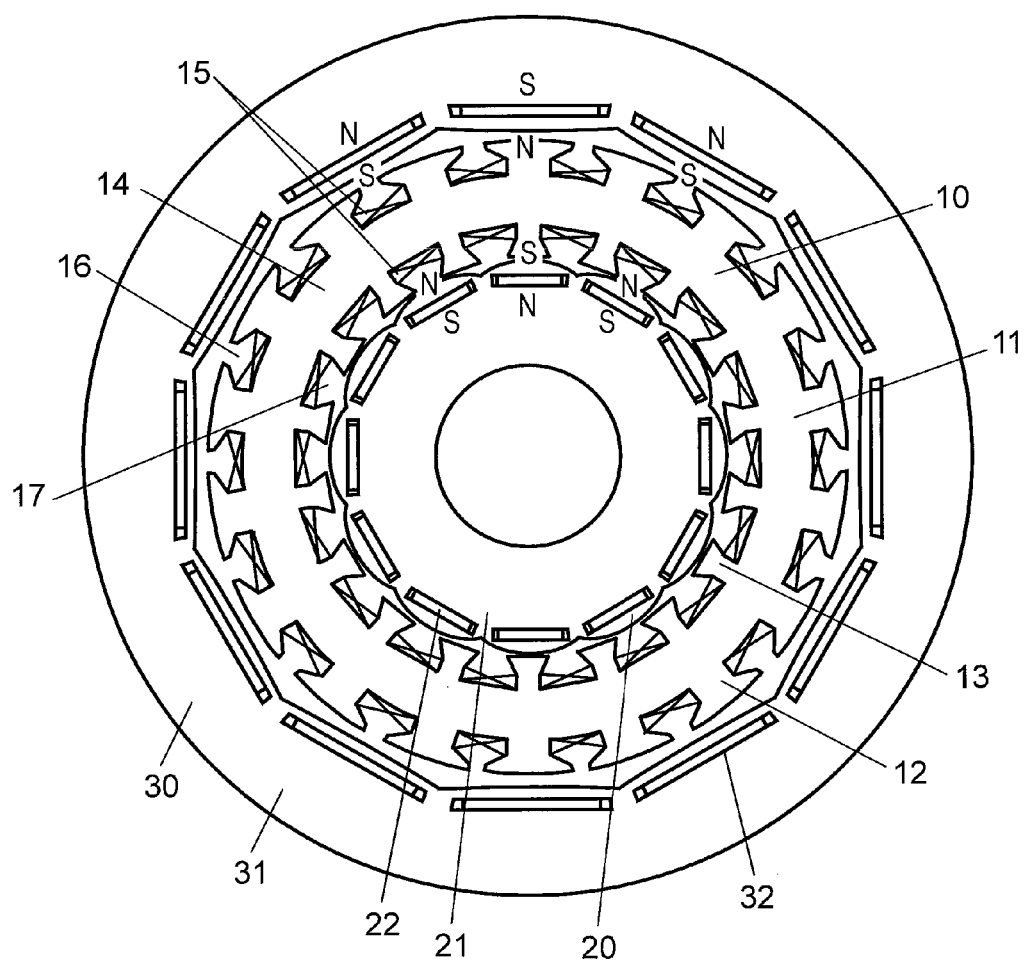
FIG. 3 shows a dual rotor motor in accordance with an embodiment of the present invention, and magnetic poles of an outer rotor have different polarity from that of opposing magnetic poles of an inner rotor.
Figure 4:
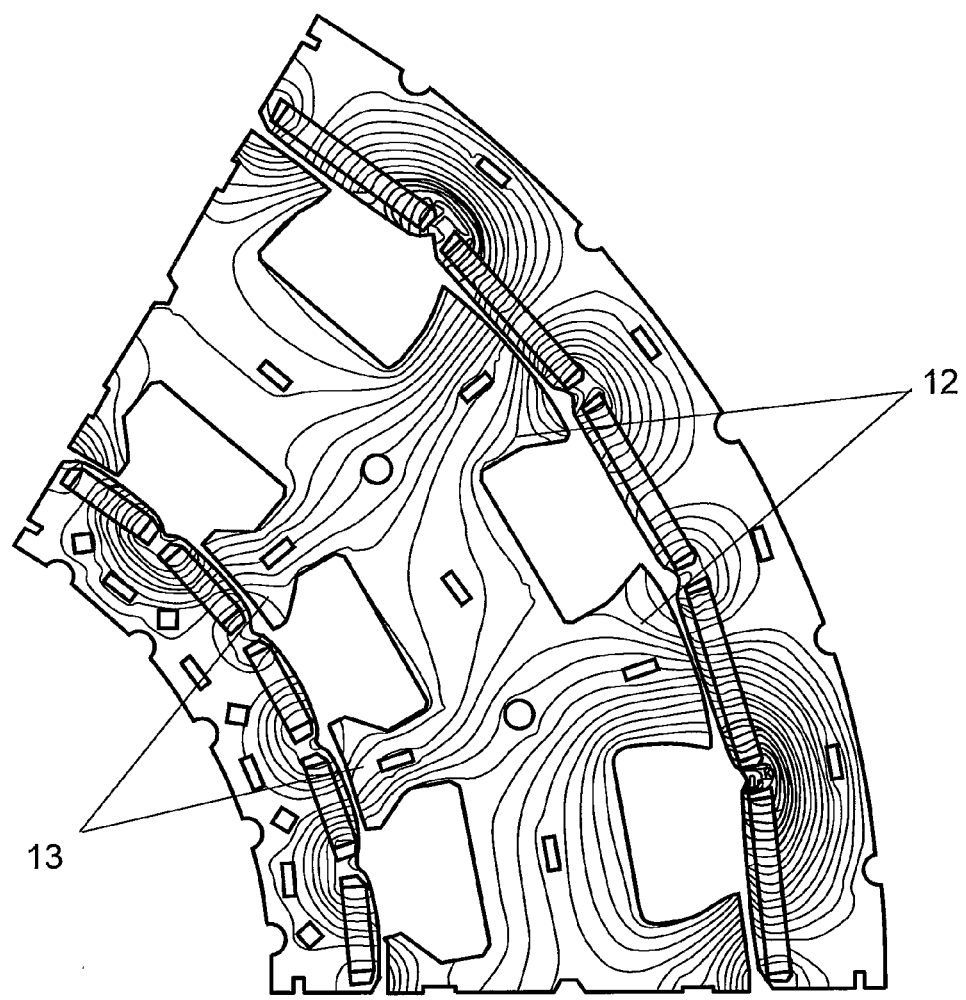
FIG. 4 shows flows of magnetic fluxes when magnetic poles of the outer rotor have different polarity from that of opposing magnetic poles of the inner rotor of the dual rotor motor in accordance with the embodiment.

FIG. 1 shows a dual rotor motor in accordance with the embodiment of the present invention, and magnetic poles of an outer rotor have the same polarity as that of opposing magnetic poles of an inner rotor. FIG. 2 shows flows of magnetic fluxes of the dual rotor motor shown in FIG. 1. FIG. 3 shows a dual rotor motor in accordance with the embodiment of the present invention, and magnetic poles of an outer rotor have different polarity from that of opposing magnetic poles of an inner rotor. FIG. 4 shows flows of magnetic fluxes of the dual rotor motor shown in FIG. 3.

As shown in FIG. 1, the dual rotor motor in accordance with the embodiment includes stator 10, inner rotor 20, and outer rotor 30. Inner rotor 20 forms an interior-magnet type rotor in which permanent magnets 22 are approx. equidistantly placed along the outer circumference of inner-rotor yoke 21. Each magnet 22 is placed this way: N-pole is located inside and S-pole is located outside of magnet 22, then N-pole is located outside and S-pole is located inside of adjacent magnet 22. Inner rotor 20 is disposed rotatably on a rotary shaft and inside stator 10. Outer rotor 30 also forms an interior-magnet type rotor in which permanent magnets 32 are approx. equidistantly placed along the inner circumference of outer-rotor yoke 31. Each magnet 32 is placed this way: S-pole is located inside and N-pole is located outside of magnet 32, then S-pole is located outside and N-pole is located inside of adjacent magnet 32. Outer rotor 30 is disposed rotatably on the rotary shaft and outside stator 10. Stator 10 includes annular stator core 11. Stator core 11 includes annular stator yoke 14, and multiple teeth formed of outer teeth 12 and inner teeth 13. Between each one of adjacent outer teeth 12, outer slot 16 is disposed, and between each one of inner teeth 13, inner slot 17 is disposed. Stator core 11 is wound with coil 15 by using opening spaces of outer slots 15 and inner slots 17. The dual rotor motor in accordance with this embodiment has two operation modes, i.e. an operation mode at a low rpm with great torque and an operation mode at a high rpm.

In the case of the operating mode at low rpm with great torque, outside magnetic poles have the same polarity as that of the opposing inside magnetic poles as shown in FIG. 1, and the magnetic flux flows as shown in FIG. 2, namely, there are two magnetic circuits independent of each other, one is a magnetic flux flowing from outer tooth 12 to adjacent outer tooth 12, and another one is a magnetic flux flowing from inner tooth 13 to adjacent inner tooth 13. A total magnetic flux of the motor amounts to the sum of the foregoing two magnetic fluxes. The greater amount of magnetic fluxes thus generates greater torque.

In the case of the operating mode at a high rpm, outside magnetic poles have different polarity from that of the opposing inside magnetic poles as shown in FIG. 3. The magnetic flux in this case flows from outer tooth 12 to adjacent outer tooth 12, and from inner tooth 13 to adjacent inner tooth 13. Besides these two flows, leakage flux flows from outer tooth 12 to inner tooth 13 and from inner tooth 13 to outer tooth 12 as shown in FIG. 4. The motor thus uses smaller amount of magnetic fluxes inter-linking with the windings, so that the induction voltage is lowered and the high rpm range is widened. In this case a smaller amount of field weakening current is produced than that produced by a conventional field weakening method, thereby preventing drastic increment in copper loss. As a result, the efficiency of the motor can be improved.

Figure 5:
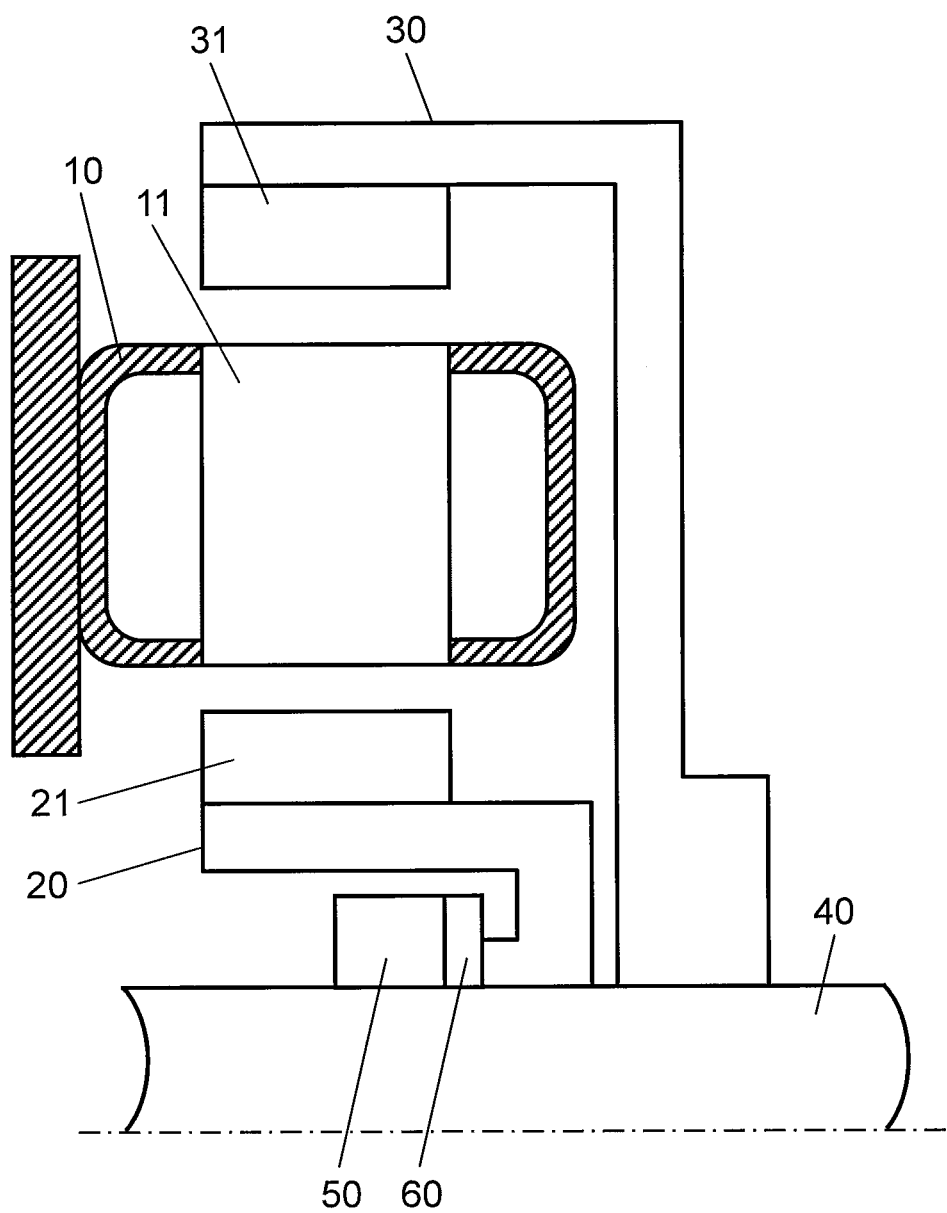
FIG. 5 is a sectional view of the dual rotor motor in accordance with the embodiment.

FIG. 5 is a sectional view of the dual rotor motor in accordance with the embodiment. Using clutch mechanism 60 that moves together with actuator 50, this dual rotor motor couples/uncouples inner rotor 20 to/from a power shaft, and controls a rotation angle. When the rotational angle is to be adjusted, actuator 50 is coupled to inner rotor 20, and when the motor is driven, actuator 50 is uncoupled from inner rotor 20. This structure allows, e.g. switching the state of the same polarity between the magnetic poles of inner rotor 20 and the opposing magnetic poles of outer rotor 30 into the state of different polarity by controlling the rotation angle of inner rotor 20 with actuator 50 coupled to inner rotor 20. The foregoing structure also allows switching the state of different polarity to the state of the same polarity by adjusting the rotation angle by the same method as discussed above. On top of that, the foregoing structure allows adjusting an angle between centers of the magnetic poles opposing to each other.

Both of inner rotor 20 and outer rotor 30 can be coupled to the same output shaft 40, whereby inside output torque and outside output torque can be combined together, and as a result, this structure can generate greater power than a structure where an inner rotor and an outer rotor are coupled to different output shafts.

On top of that, actuator 50 coupled to inner rotor 20 can control the rotation angle of inner rotor 20, whereby an angle between centers of the opposing magnetic poles can be adjusted to any value, so that an induction voltage can be varied sequentially, and the high rpm range as well as output torque can be adjusted to any value.

INDUSTRIAL APPLICABILITY

The dual rotor motor of the present invention is suitable for home appliances and automobiles because those products need great torque at low rpm and a wide range of high rpm.

The invention claimed is:

1. A motor forming a dual rotor motor comprising:
   a stator including a stator core formed of an annular yoke and a plurality of teeth, and a winding wound on the stator core;
   an inner rotor being rotatable with a shaft and disposed radially inside the stator, the inner rotor having a radially outer surface facing the stator and having a series of inner permanent magnets arranged in alternate polarities along the radially outer surface, each inner permanent magnet being polarized in a radial direction;
   an outer rotor being rotatable with the shaft and disposed radially outside the stator, the outer rotor having a radially inner surface facing the stator and having a series of outer permanent magnets arranged in alternate polarities along the radially inner surface, each outer permanent magnet being polarized in the radial direction;
   a clutch mechanism that couples and decouples the inner rotor to and from the shaft; and
   an actuator configured to move together with the clutch mechanism to adjust a relative angular position between the inner and outer permanent magnets, wherein the actuator is coupled to the inner rotor to adjust a relative angular position between the inner and outer permanent magnets and decoupled from the inner rotor when the motor is driven, and the relative angular position is adjustable between a first position at which the inner and outer permanent magnets are radially aligned at the same polarity and a second position at which the inner and outer permanent magnets are radially aligned at the opposite polarities; and wherein when the relative angular position is at the first position, the motor is operated at a low rpm, whereas when the relative angular position is at the second position, the motor is operated at a high rpm.

2. The motor of claim 1, wherein the inner rotor and the outer rotor are coupled to the same shaft.

3. The motor of claim 1, wherein the inner and outer permanent magnets are aligned at their centers when they are at the first and second positions.

4. The motor of claim 2, wherein the inner and outer permanent magnets are aligned at their centers at the first and second positions.

* * * * *